US012670333B2

(12) United States Patent
Rodriguez et al.

(10) Patent No.: US 12,670,333 B2
(45) Date of Patent: Jun. 30, 2026

(54) IDENTIFICATION OF SYMBOL DRIFT IN WRITTEN DISCOURSE

(71) Applicant: International Business Machines Corporation, Armonk, NY (US)

(72) Inventors: Laura Rodriguez, Durham, NC (US); Amy D Travis, Arlington, MA (US); Hiru Fernando, Cary, NC (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 18/444,884

(22) Filed: Feb. 19, 2024

(65) Prior Publication Data

US 2025/0265421 A1     Aug. 21, 2025

(51) Int. Cl.
*G06F 40/35*          (2020.01)
*G06F 40/284*          (2020.01)

(52) U.S. Cl.
CPC ............ *G06F 40/35* (2020.01); *G06F 40/284* (2020.01)

(58) Field of Classification Search
None
See application file for complete search history.

(56) References Cited

U.S. PATENT DOCUMENTS

| | | | |
|---|---|---|---|
| 8,538,984 B1 | 9/2013 | Mahabal et al. | |
| 9,092,517 B2 | 7/2015 | Paparizos et al. | |
| 9,239,823 B1 | 1/2016 | Upstill et al. | |
| 9,239,880 B2 | 1/2016 | Dong et al. | |
| 9,489,370 B2 | 11/2016 | Onishi et al. | |
| 11,977,847 B2 * | 5/2024 | Szanto | G06F 40/30 |
| 12,423,960 B1 * | 9/2025 | Balles | G06N 20/20 |
| 12,437,209 B2 * | 10/2025 | Zoldi | G06N 7/01 |
| 2008/0071721 A1 * | 3/2008 | Wang | G06N 20/00 |
| | | | 706/48 |

(Continued)

FOREIGN PATENT DOCUMENTS

| | | |
|---|---|---|
| CN | 108153735 A | 6/2018 |
| CN | 105095204 B | 12/2018 |

(Continued)

OTHER PUBLICATIONS

Klaussner, Carmen, Carl Vogel, and Arnab Bhattacharya. "Detecting Linguistic Change Based on Word Co-occurrence Patterns." HistoInformatics@ CIKM. 2017. (Year: 2017).*

(Continued)

*Primary Examiner* — Douglas Godbold
(74) *Attorney, Agent, or Firm* — Kristofer Haggerty

(57)          ABSTRACT

An embodiment establishes a text corpus database based at least in part on text data received from a written discourse. The embodiment extracts a first set of terms from the text corpus database and a first set of collocations for each term of the first set of terms. The embodiment constructs a summation model based at least in part on the first set of terms and the first set of collocations for each term of the first set of terms. The embodiment inputs additional text data into the summation model to determine a probability score that defines the probability that a term stored on the text corpus database will change meaning. The embodiment displays the probability score on a user interface.

18 Claims, 9 Drawing Sheets

(56) References Cited

U.S. PATENT DOCUMENTS

| | | | |
|---|---|---|---|
| 2017/0330109 A1 | 11/2017 | Maughan et al. | |
| 2018/0247221 A1* | 8/2018 | Park | G06F 40/20 |
| 2021/0240691 A1* | 8/2021 | Bertoni Scarton ... | G06F 40/205 |
| 2023/0186176 A1* | 6/2023 | Cheng | G06N 20/00 |
| | | | 706/12 |
| 2024/0012841 A1* | 1/2024 | Voyles | G06F 40/40 |
| 2024/0403692 A1* | 12/2024 | Schell | G06N 3/045 |
| 2025/0245439 A1* | 7/2025 | Jang | G06F 40/279 |

FOREIGN PATENT DOCUMENTS

| | | |
|---|---|---|
| CN | 106445998 B | 8/2020 |
| CN | 115409037 A | 11/2022 |
| JP | 5754019 B2 | 7/2015 |
| JP | 2022514509 A | 2/2022 |
| KR | 102318502 B1 | 10/2021 |
| WO | 2010035412 A1 | 4/2010 |

OTHER PUBLICATIONS

Dries, Anton, and Ulrich Rückert. "Adaptive concept drift detection." Statistical Analysis and Data Mining: The ASA Data Science Journal 2.5-6 (2009): 311-327. (Year: 2009).*

Kanhabua et al., Quest: query expansion using synonyms over time, In Joint European Conference on Machine Learning and Knowledge Discovery in Databases, pp. 595-598, 2010.

Unipapers, Free Rewording Generator, 2023, https://unipapers.org/rewording-tool.

* cited by examiner

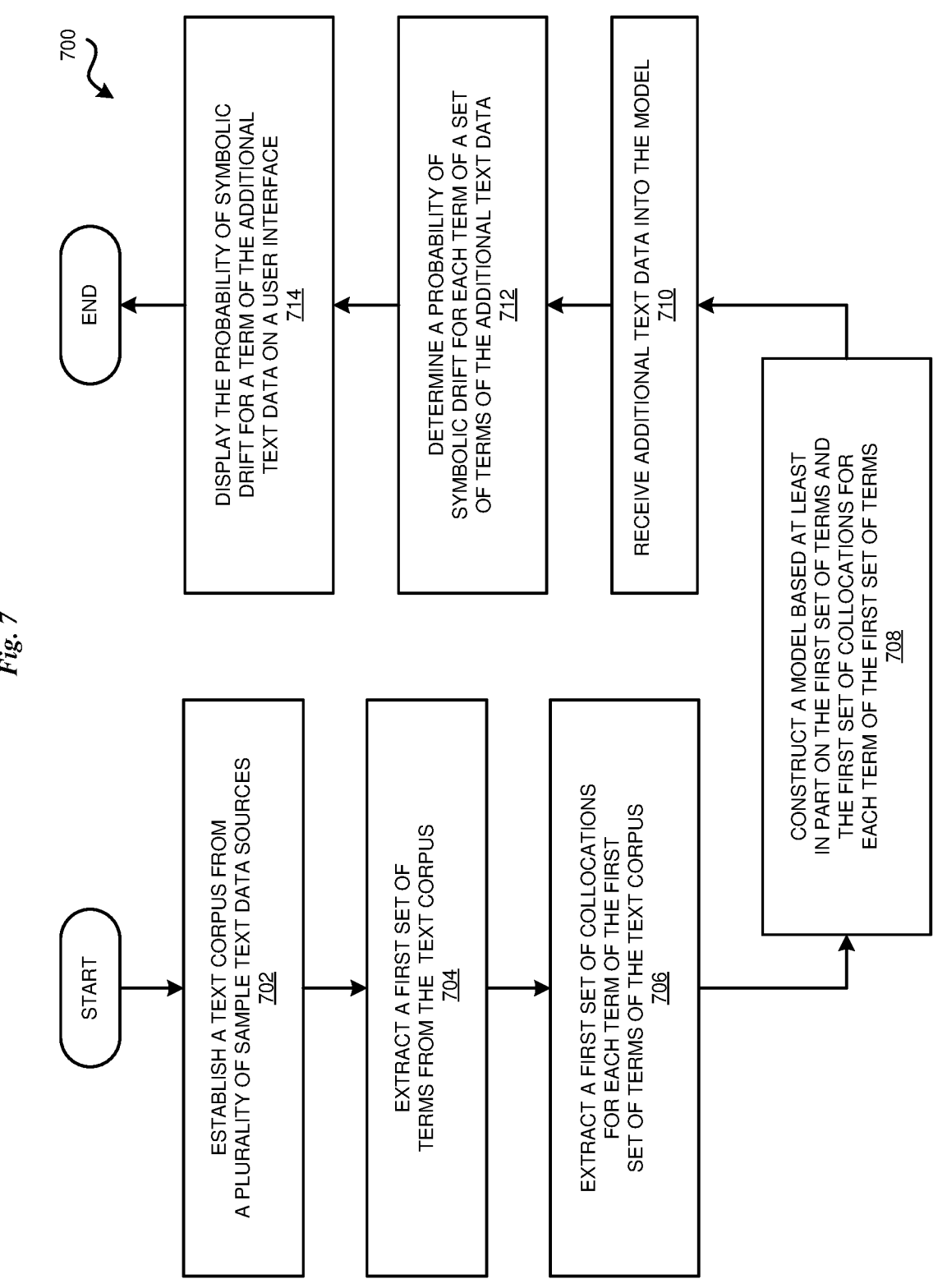

START

ESTABLISH A TEXT CORPUS FROM
A PLURALITY OF SAMPLE TEXT DATA SOURCES
702

EXTRACT A FIRST SET OF
TERMS FROM THE TEXT CORPUS
704

EXTRACT A FIRST SET OF COLLOCATIONS
FOR EACH TERM OF THE FIRST
SET OF TERMS OF THE TEXT CORPUS
706

CONSTRUCT A MODEL BASED AT LEAST
IN PART ON THE FIRST SET OF TERMS AND
THE FIRST SET OF COLLOCATIONS FOR
EACH TERM OF THE FIRST SET OF TERMS
708

RECEIVE ADDITIONAL TEXT DATA INTO THE MODEL
710

DETERMINE A PROBABILITY OF
SYMBOLIC DRIFT FOR EACH TERM OF A SET
OF TERMS OF THE ADDITIONAL TEXT DATA
712

DISPLAY THE PROBABILITY OF SYMBOLIC
DRIFT FOR A TERM OF THE ADDITIONAL
TEXT DATA ON A USER INTERFACE
714

END

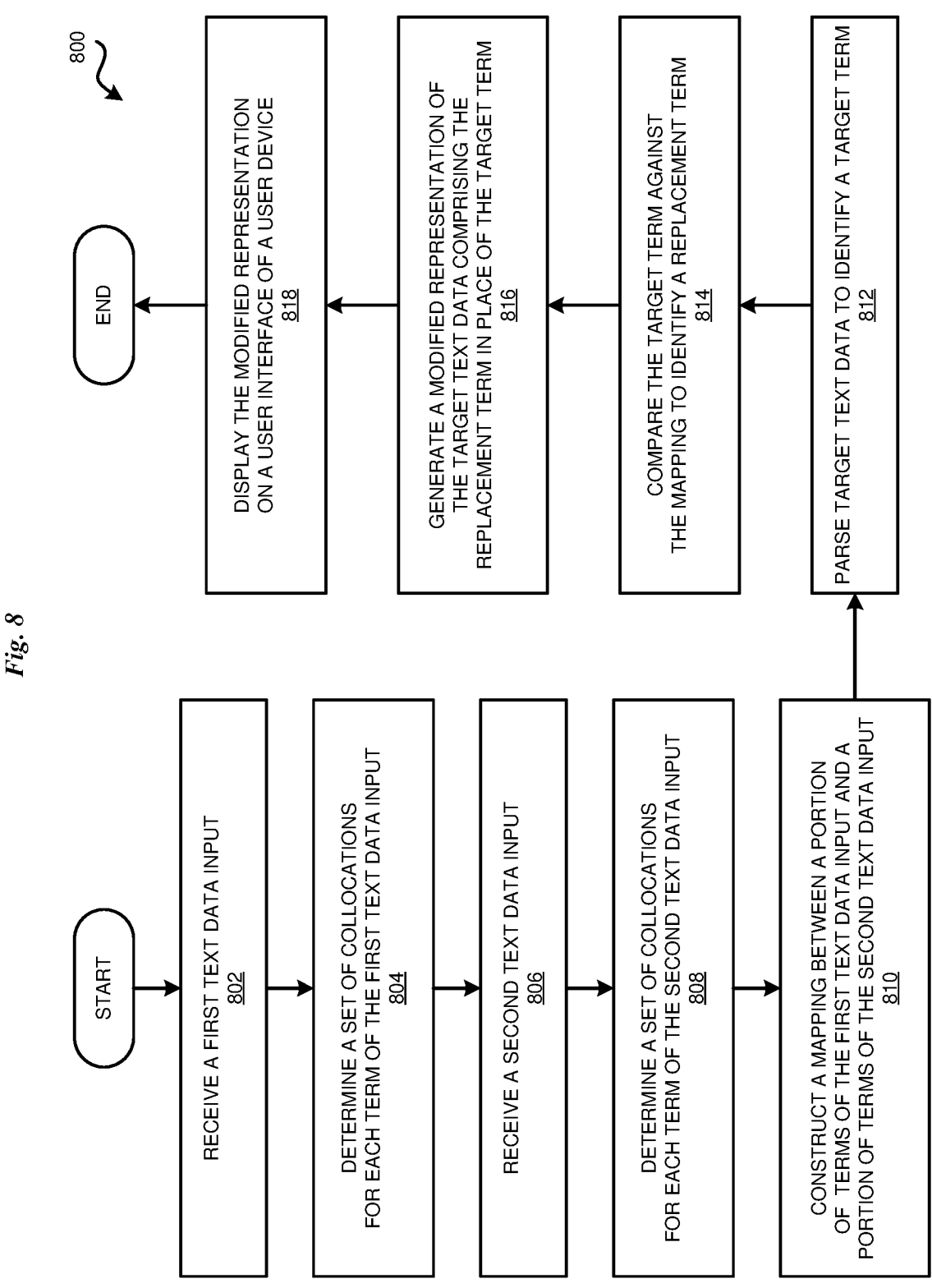

Fig. 8

START

RECEIVE A FIRST TEXT DATA INPUT
802

DETERMINE A SET OF COLLOCATIONS
FOR EACH TERM OF THE FIRST TEXT DATA INPUT
804

RECEIVE A SECOND TEXT DATA INPUT
806

DETERMINE A SET OF COLLOCATIONS
FOR EACH TERM OF THE SECOND TEXT DATA INPUT
808

CONSTRUCT A MAPPING BETWEEN A PORTION
OF TERMS OF THE FIRST TEXT DATA INPUT AND A
PORTION OF TERMS OF THE SECOND TEXT DATA INPUT
810

PARSE TARGET TEXT DATA TO IDENTIFY A TARGET TERM
812

COMPARE THE TARGET TERM AGAINST
THE MAPPING TO IDENTIFY A REPLACEMENT TERM
814

GENERATE A MODIFIED REPRESENTATION OF
THE TARGET TEXT DATA COMPRISING THE
REPLACEMENT TERM IN PLACE OF THE TARGET TERM
816

DISPLAY THE MODIFIED REPRESENTATION
ON A USER INTERFACE OF A USER DEVICE
818

END

800

IDENTIFICATION OF SYMBOL DRIFT IN WRITTEN DISCOURSE

BACKGROUND

The present invention relates generally to computational linguistics. More particularly, the present invention relates to a method, system, and computer program for identifying symbol drift in written discourse.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

Natural language processing (NLP) is a field within AI that includes the development of machine learning technology that enables computers to interpret, manipulate, and comprehend human language. Accordingly, NLP is an interdisciplinary subfield of computer science and linguistics that is concerned with giving computers the ability to understand text and spoken words in much the same way human beings can. NLP techniques often combine computational linguistics—rule-based modeling of human language—with statistical, machine learning, and deep learning models. Together, these technologies enable computers to process human language in the form of text or voice data and to 'understand' its full meaning, complete with the speaker or writer's intent and sentiment. There are currently various applications of NLP technology in existence, including but not limited to, computer programs that translate text from one language to another, respond to spoken commands, and summarize large volumes of text rapidly. Further, NLP technology is found in various embodiments, including but not limited to, voice-operated GPS systems, digital assistants, speech-to-text dictation software, customer service chatbots, and more.

SUMMARY

The illustrative embodiments provide for identification of symbol drift in real-time chat discourse. An embodiment establishes a text corpus database based at least in part on text data received from a written discourse. The embodiment extracts a first set of terms from the text corpus database and a first set of collocations for each term of the first set of terms. The embodiment constructs a summation model based at least in part on the first set of terms and the first set of collocations for each term of the first set of terms. The embodiment inputs additional text data into the summation model to determine a probability score that defines the probability that a term stored on the text corpus database will change meaning. The embodiment displays the probability score on a user interface.

Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 7 depicts a flowchart of an example process for identifying symbolic drift in accordance with an illustrative embodiment;

FIG. 8 depicts a flowchart of an example process for detecting a synonym in a written discourse in accordance with an illustrative embodiment.

DETAILED DESCRIPTION

Figure 1:
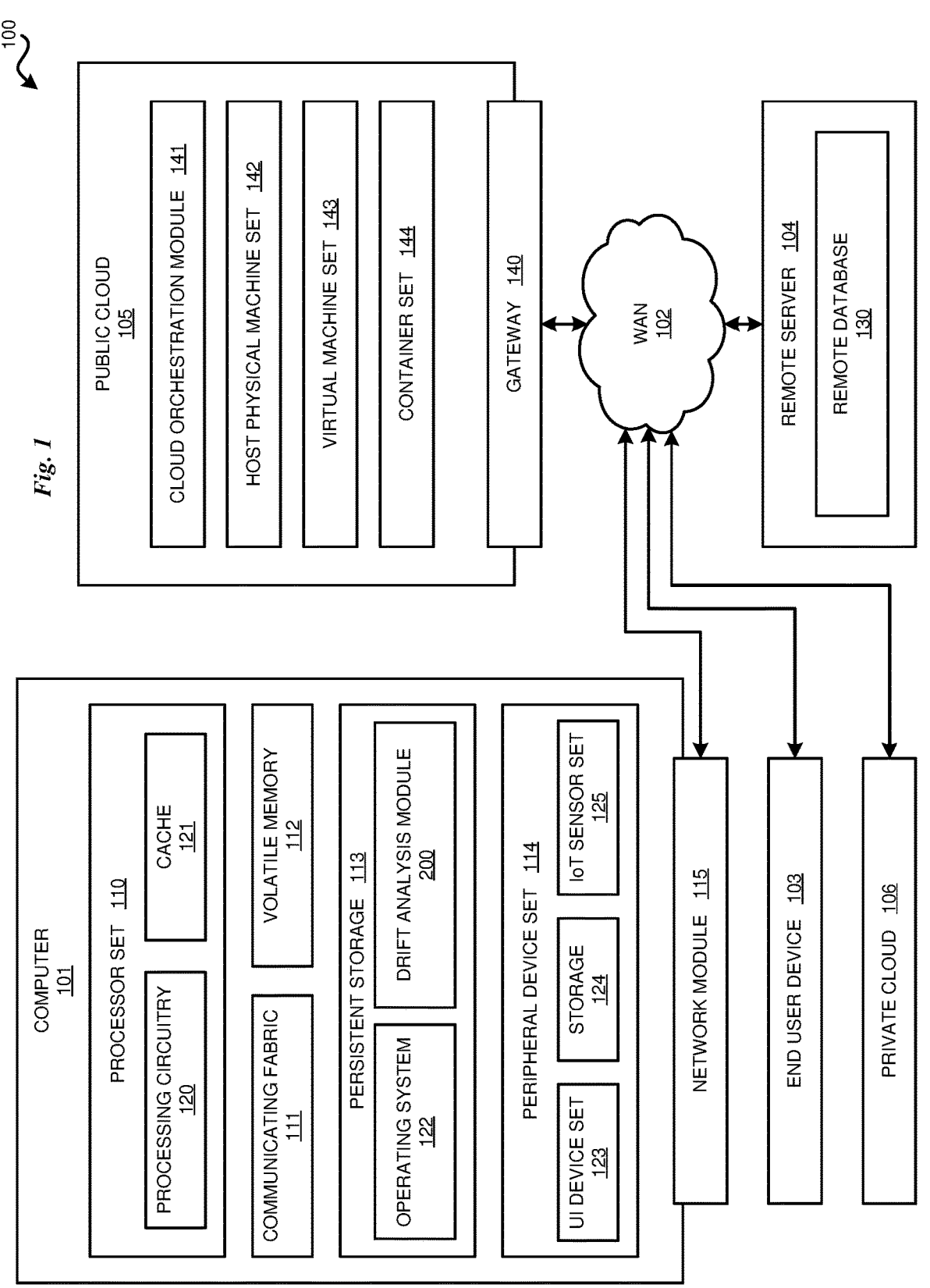
FIG. 1 depicts a block diagram of a computing environment in accordance with an illustrative embodiment.

As a society and the language spoken by a society evolves, the meaning of terms of that language may likewise evolve and experience a transformative departure from their original understood meanings and adopt new understood meanings. For example, the term "gas lighting" originally was understood as the production of artificial light from combustion of a fuel gas, i.e., the creation of light from burning a gas. However, fast forward to 1938, the term "gaslighting" became understood as a colloquialism for the act of manipulating a person into questioning their own perception of reality. In the present day, the term "gaslighting" has become so popularized, that the term it is often employed simply to describe the action of knowingly lying about a past event.

Based on the example above, it is evident that the present meaning of a term may have radically changed from the term's original meaning, based on how the term is used. Further, one way to determine the meaning of a term may be to examine the context in which the term exists. For example, the original context of the term "gas lighting" is much different from the current context in which the term "gaslighting" may exist. Accordingly, the context of a term may provide an indication to the current meaning and understanding of that term.

Natural language processing (NLP) is an interdisciplinary field within computer science that combines computational linguistics with machine learning to provide systems and processes capable of interacting with human language in a similar manner that a human being would interact with language. However, despite the rapid and substantial development of NLP technologies over the past decade, there are still a number of problems that currently exist in the NLP technologies that exist today.

One problem facing NLP technology includes the problem of "symbolic drift". An example of symbolic drift may be illustrated by the example provided above, which showcases the evolving and changing meaning between the originally used term "gas lighting" and the currently used term "gaslighting". Accordingly, symbolic drift refers to the phenomenon where the meaning of symbols, such as words or other linguistic elements, changes over time or with respect to a particular context. There are many possible causes of symbolic drift, including but not limited to, shifts in meaning due to cultural, social, circumstantial, and/or technological factors.

Further, another problem facing NLP technology may include the ability to understand semantic relationships between symbols, such as for example, emerging synonyms for terms. Accordingly, since the meaning of terms may drift over time, symbolic drift can likewise lead to the creation of synonyms that do not appear identical to a computer. For example, suppose a company rebrands and the company name changes. In such a scenario, the new name of the company and the old name of the company may be synonyms that both refer to the actual company, however the recognition that both the old company name and new company names are synonyms of each other might not be apparent to a computer. Further, synonymous relationships between terms may also be overlooked in other situations, such as when different writers use different terms (e.g., one person using an acronym where the other does not) or one person using a particular word (e.g., "customer") to mean something, while another person uses another different word (e.g., "account") to refer to that same thing. Accordingly, language analysis done on a corpus of data may miss apparent synonyms due to symbolic drift.

Despite improvements to NLP technologies, problems caused by symbolic drift, such as those discussed that are resultant due to the changing meaning of a term over time or with respect to context, as well as those resultant due to unidentified synonymous relationships between terms, maintain a long felt but unmet need to resolve.

The present disclosure addresses the deficiencies described above by providing a process (as well as a system, method, machine-readable medium, etc.) that develops a system that recognizes symbolic drift of terms over time and/or with respect to context. Disclosed embodiments combine corpus linguistic analysis and probabilistic simulation to recognize symbolic drift of terms over time. An embodiment of the present disclosure includes determining a likelihood that a term's meaning will change based at least in part on changing co-occurrence of collocate terms. Further, an embodiment of the present disclosure generates temporal data that enables tracking of a meaning of a term over time. Another embodiment of the present disclosure includes detecting a synonym of a term based on similar co-occurrence of collocates between terms, such that a first term and a second term having sufficiently similar collocations may be defined as synonyms of each other.

The illustrative embodiments provide for identification of symbolic drift in a written discourse over time. One embodiment is directed towards a process that includes identification of symbolic drift in text data from real-time chat discourse; however, use of this example is not intended to be limiting, and other embodiments of the disclosed process are considered, some of which are described herein. Symbolic drift as referred to herein refers to a phenomenon in which the meaning of a word, term, phrase, or other part of language changes over time or with respect to context. Embodiments disclosed herein describe the symbol as a word or term; however, use of this example is not intended to be limiting, but is instead used for descriptive purposes only. Instead, the symbol may include any part of speech, i.e., any symbol that is a part of a written language.

Further, as used throughout the present disclosure, the term "symbolic drift" may also refer to a phenomenon in which a specific term or symbol undergoes a gradual replacement or transition with a different term or symbol over a period of time. This kind of symbolic shift can occur within a particular domain, community, context, or language, leading to a transformation in the commonly accepted or employed representation of a concept or idea.

As used throughout the present disclosure, the term "written discourse" refers to a particular source of written text. A written discourse may include a particular structure, coherence, logical development, and range of linguistic resources within the written text. Linguistic resources may refer to grammar and vocabulary, and the variety of grammatical structures and vocabulary used within the written discourse. Examples of a written discourse may include any text-based media comprising text data, including, but not limited to, books, articles, websites, blogs, forums, chat logs, technical documentation, training materials, legal documents, medical records, customer reviews, surveys, government publications, speech transcripts, programming code, emails, text messages, educational materials, financial reports, as well as any other source of text data.

Illustrative embodiments include establishing a text corpus database. In an embodiment, a text corpus stored on the text corpus database may pertain to a particular domain and/or originate from a particular text data source. In an embodiment, the text corpus database may receive text data from various applications and/or text data sources, as described in greater detail herein.

Illustrative embodiments include receiving a text corpus from the text corpus database, and extracting a first set of terms contained within the text corpus. Further, illustrative embodiments include extracting a first set of collocations for each term of the first set of terms extracted from the text corpus. An embodiment includes utilizing one or more corpus linguistic techniques to extract terms and collocations of terms contained in the text corpus.

Illustrative embodiments include constructing a computational model to predict drift in a meaning of at least one term of the set of terms extracted from the text corpus. An embodiment includes constructing a discrete Markov model to predict the drift in the meaning of the at least one term. Further, illustrative embodiments include training the Markov model on the set of terms and the collocations for each term of the set of terms to produce a trained computational model. Further, in some such embodiments, additional text data is continuously input into the trained computational model to generate a likelihood that at least one term of the set of terms will change meaning based at least in part on a difference between collocations of the at least one term at a first moment in time and collocations of the at least one term at a second moment in time.

Illustrative embodiments include displaying the likelihood that a meaning of the at least one term will change. In an embodiment, the likelihood that the meaning of the at least one term will change is displayed via a user interface, including for example, a graphical user interface.

Illustrative embodiments include re-training the computational model based at least in part on a second text corpus input into the trained computational model. In some such embodiments, the first text corpus belongs to a first domain, whereas the second text corpus belongs to a second domain. Further, in some such embodiments, the first domain concerns a different subject matter than the second domain.

Illustrative embodiments include integrating the trained computational model into a pre-existing software application. In a particular embodiment, the trained computational model is integrated into a chat application to provide real-time identification of symbol drift based on chat text data. Illustrative embodiments further include visually overlaying computer-generated graphics upon a detect terms corresponding to a symbolic drift. In an embodiment, the computer-generated graphics provide information related to the symbolic drift.

Illustrative embodiments include analyzing a text corpus to extract various features for use in constructing a computational model. In an embodiment, the process includes utilizing corpus linguistics to establish entities, collocations, and other linguistic markers within one or more written discourses of the text corpus. Accordingly, in the context of corpus linguistics, an "entity" refers to an identifiable unit or item within a text that is of interest for analysis. An entity may include a linguistic element that shares common characteristics or attributes. Further accordingly, a named entity may include a real-world object, such as a person, organization, location, date, time, or any other well-defined concept, that may be mentioned in a text. Named Entity Recognition includes identifying and classifying an entity within a text corpus. Establishing entities enables extraction of structured information from unstructured text.

For example, suppose the text corpus includes the sentence: "IBM was founded in 1911 in Endicott, New York as the Computing-Tabulating-Recording Company (CTR) and was renamed "International Business Machines" in 1924." The following named entities may be extracted from the example sentence:

Organizations: IBM, Computer-Tabulating-Recording Company, CTR, International Business Machines Location: Endicott, New York Dates: 1911, 1924

In the above example, named entities are extracted and classified into different categories, thereby providing a structured representation of the information contained in the text. Further, analyzing the text corpus to extract entities, collocations, and other linguistic markers provides insight into whether particular terms, when coupled by surrounding terms, change or drift over time.

Illustrative embodiments include utilizing one or more probabilistic simulation techniques to determine the probability of a term drifting over time. In an embodiment, the one or more probabilistic techniques includes discrete Markov analysis. However, the use of this example technique is not intended to be limit the scope of the present disclosure, and the utilization of any probabilistic technique that may be known to one having ordinary skill in the art is contemplated herein. Illustrative embodiments include calculating a probability that the meaning of a term or symbol will drift or change. In an embodiment, calculating a probability that a particular term or symbol will drift is based at least in part on the changing co-occurrence of collocations of that particular term or symbol over time.

One innovative aspect of the subject matter described herein can be embodied in methods that include the actions of evaluating a written discourse, and more particularly a sentence of a written discourse, to determine whether the sentence contains any target term that correspond to a corresponding synonym term. Another innovative aspect of the subject matter described herein can be embodied in methods that include the actions of evaluating a written discourse to determine whether any terms within the written discourse have experienced a "drift", such that a particular term within the discourse that has been previously used in a given context has been replaced with a different particular term that is presently used in the given context. Accordingly, the aspect related to determining whether an original term has drifted (i.e., replaced by a different term/symbol connoting the same meaning of the original term) enables temporal based tracking of term usage based on context. Embodiments of the present disclosure may have various applications. For example, embodiments of the present disclosure enable identification of when an originally used term has been replaced over time. Embodiments of the present disclosure also enable identification of a synonym for a term is used in a particular context.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as drift analysis module 200 that detects drift in terminology encapsulated in written discourse of a particular domain. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
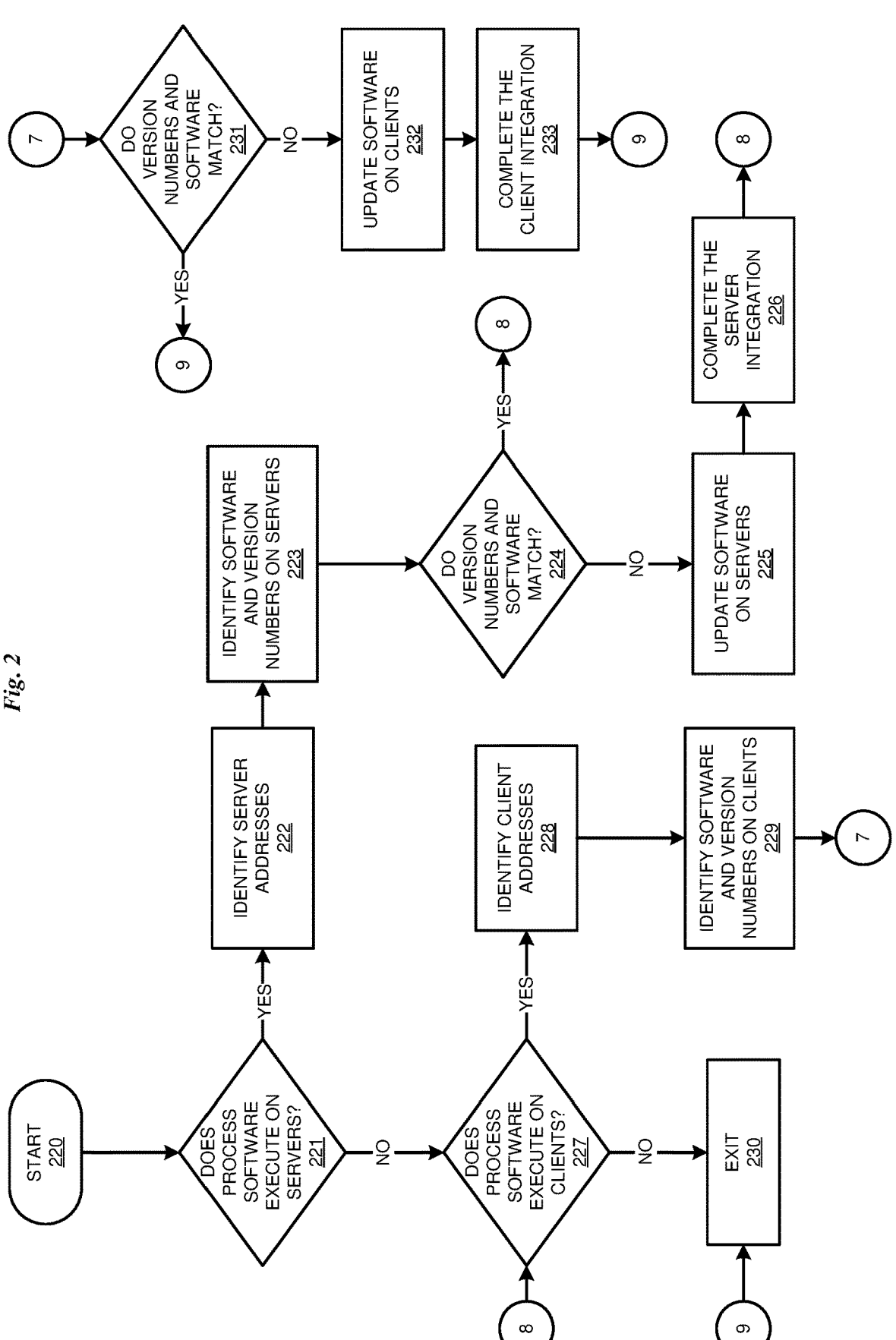
FIG. 2 depicts a block diagram of an example system and method for integration in accordance with an illustrative embodiment.

With reference to FIG. 2, this figure depicts a block diagram of an example system and method for integration in accordance with an illustrative embodiment. The process software including the multi-layer network simulation software is integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

Figure 3:
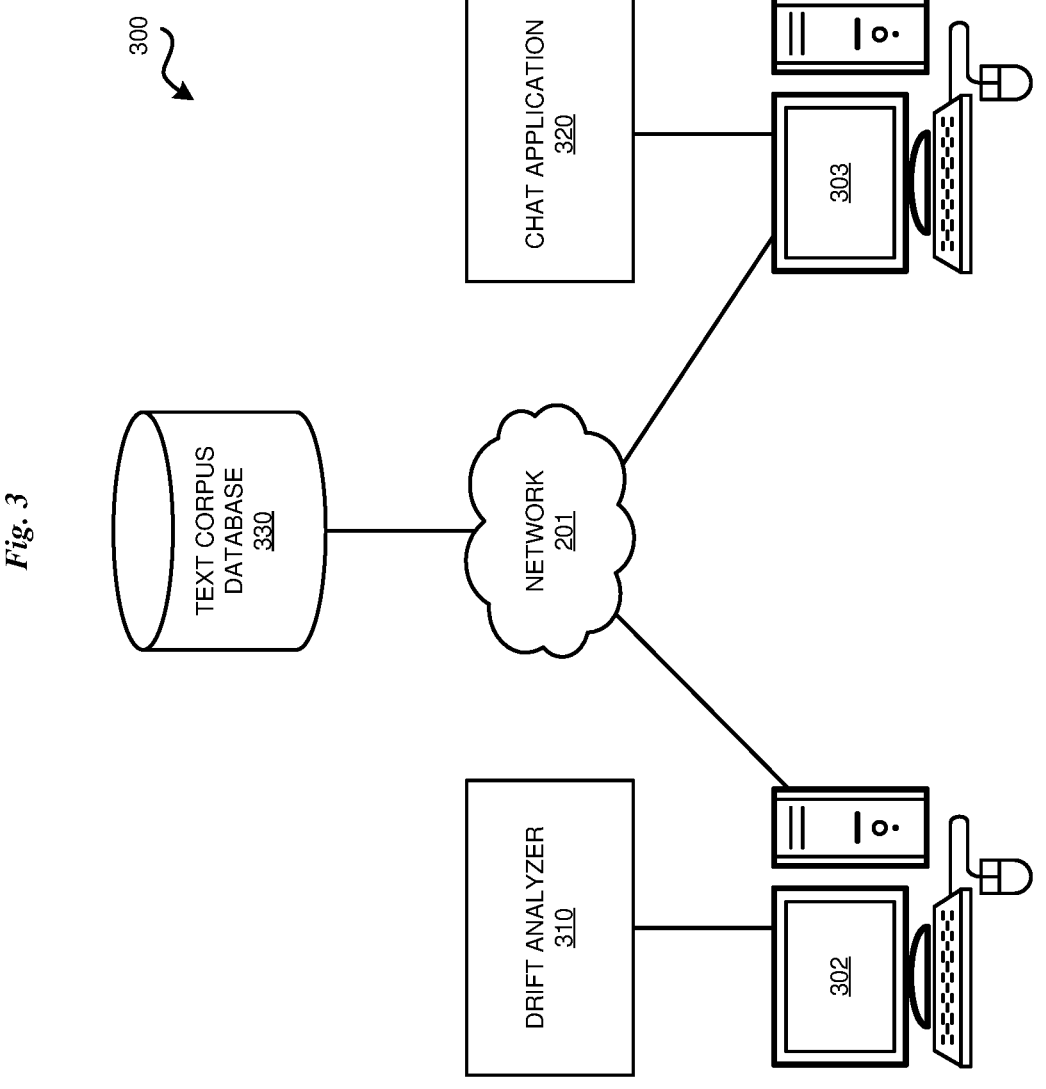
FIG. 3 depicts a block diagram of an example computing environment of a drift analysis module in accordance with an illustrative embodiment.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits With reference to FIG. 3, this figure depicts a block diagram of an example computing environment 300 in accordance with an illustrative embodiment. In the illustrated embodiment, drift analyzer 310 may include aspects of the drift analysis module 200 of FIG. 1. In the illustrative embodiment, the computing environment 300 is depicted including a drift analyzer 310 deployed from an administrator device 302, a text corpus database 320, and a chat application 320 deployed from a user device 303, all in communication with each other via network 201. Although this particular configuration is depicted, it is contemplated herein that other suitable computing environments may be configured, and the exact computing environment configuration is not a limiting aspect of the present disclosure.

In the illustrated embodiment, the drift analyzer 310 is a software module configured to identify and analyze symbolic drift in written discourse, such as for example, real-time chat discourse received from chat application 320. Although the illustrated embodiment describes identifying and analyzing symbolic drift in real time chat discourse, the use of this example is not intended to be limiting, and it is contemplated that other embodiments may include identifying and analyzing symbolic drift in other forms of media. In some embodiments, the media includes text-based media including text data. An example of media may include, but is not limited to, books, articles, websites, blogs, forums, chat logs, technical documentation, training materials, legal documents, medical records, customer reviews, surveys, government publications, speech transcripts, programming code, emails, text messages, educational materials, financial reports, as well as any other source of text data.

In an embodiment, the drift analyzer 310 may be configured to determine likelihood of symbolic drift in the following example manner. The drift analyzer 310 may ingest a corpus of text data originating from various text data sources, such as those described herein. Further, the drift analyzer 310 may process the text data into tokens, such that each token represents an individual word or term within the corpus. Further, the drift analyzer may construct a Markov model such that each state of the Markov model represents a specific meaning or usage of each term. In an embodiment, transitions between states may be determined by the collocations that appear for each term. For example, if a term frequently co-occurs with certain other terms, those associations may become the transitions in the model.

Further, the Markov model constructed may be trained in part via the use of historical data. This may involve analyzing the context in which a term has been used in the past and establishing transition probabilities between different meanings based on collocations. Once the Markov model is trained, the model can be used to predict the future state of the term in the corpus. By observing new collocations, the model can estimate the likelihood of the term transitioning to a different meaning. In an embodiment, the model is continuously updated as the corpus stored on text corpus database 330 evolves and receives additional text data. This allows the Markov model to adapt to shifts in language usage and predict when a term might change its meaning based on the emerging collocations. By combining a Markov model with corpus linguistics, the drift analyzer 310 tracks semantic shifts in language by predicting when terms are likely to undergo changes in meaning based on their contextual associations.

Accordingly, processing the conjugates (contexts or collocates) in the Markov model enhances the accuracy of predicting terms likely to undergo changes in meaning. Conjugates, in this case, may refer to words or terms that frequently co-occur with the target term in a specific context. By incorporating information about the collocates of a term into the Markov model, the drift analyzer 310 accounts for the surrounding linguistic environment, which enables the model to capture nuanced semantic shifts more effectively. For example, if certain collocates consistently appear with a term before a change in meaning occurs, the Markov model can learn these patterns and use them to predict future shifts. Accordingly, the conjugates provide information for the Markov model that enables the model to make more accurate predictions about when terms in a text corpus are likely to undergo changes in meaning based on the observed linguistic patterns and associations.

The drift analyzer 310 may leverage corpus linguistic analysis and probabilistic simulation to recognize the symbolic drift of terms over time. In an embodiment, the drift analyzer 310 may be configured to analyse corpora of text using linguistic techniques, such as, for example, corpus linguistics and/or topic modelling. Further, in an embodiment, the drift analyzer 310 may be configured to build a summation model based at least in part on results of analysing the corpora of text. Further, in an embodiment, the drift analysis module 310 may be configured to utilize the summation model to detect symbolic drift in a particular written discourse. Further, in an embodiment, the drift analyzer 310 may be further tuned for a specific domain (e.g., literary discourse, financial discourse, sales discourse, contract discourse, etc.). In an embodiment, the drift analyser 310 is configured to detect a synonym that may have replaced an original term over a period of time. In an embodiment, the drift analyser 310 is configured to a detect synonym of a term used in a context where the term and the synonym both possess the same meaning.

In an embodiment, the drift analyser 310 may receive text data from another application, such as for example, chat application 320. In the illustrated embodiment, the drift analyser may receive and analyse chat text data from chat application 320, and may detect one or more synonym terms for one or more terms within the text data based on context. In such an embodiment, the one or more terms may be replaced with the one or more synonym terms.

In another embodiment, the drift analyser 310 is configured to determine the likelihood that a meaning of previously used term is going to drift. Accordingly, in such embodiments, the drift analyser 310 may determine the likelihood that a previous meaning associated with a previously used term is going to be replaced with a new meaning associated with the term. Although a chat application 320 is shown and described in a particular embodiment, other types of applications may be connected to the drift analyser 310 to enable drift analyser 310 to track drift of meaning of terms over time. For example, in another embodiment, the drift analyser 310 may receive and analyse text data from blog posts and determine the likelihood that a meaning of a term or terms contained within the blog posts will drift over time.

In the illustrated embodiment, text corpus database 330 stores text data including one or more text corpora. Each text corpus stored on the text corpus database 330 may originate from a particular text data source. In the illustrated embodiment, text data may be generated from a user deploying a chat application 320 via user device 303. However, use of this example is not limiting, and it is understood that text data may originate from any other text data source, including but not limited to, the example text data sources described herein.

In the illustrated embodiment, the drift analyser module 310 utilizes one or more corpus linguistic techniques to establish entities, collocations and other linguistic markers within the text data, i.e., a written discourse generated over chat application 320. Accordingly, performing the one or more corpus linguistic techniques provides insight to whether particular terms (when coupled), which exist in linguistic markers, change or drift over time. Further, in an embodiment, the drift analyser module 310 utilizes one or more probabilistic simulation techniques, such as, for example, a discrete Markov analysis, to calculate the probability of a term drifting over time.

In the illustrated embodiment, the drift analyser module 310 utilizes the results of the analysis performed using corpus linguistics to determine arrangements of the words, as well as calculates the probability of particular words changing over time, given their collocations. In an embodiment, the drift analyser module 310 constructs a summation model based at least in part on the results of the analysis performed. In an embodiment, summation model may be constructed according to the following example process. By analysing text sequences in the text data, the process may determine a probability of a sequence of words appearing in a sentence. Further, in an embodiment, the process models the probability of words appearing in a discrete sequence. Further, in an embodiment, the model is utilized to determine the change in likelihood of terms between left and right collocations. In an embodiment, the measurement of likelihood is achieved via a likelihood function for estimation of maximum likelihood, such as for example, a log-likelihood function.

In an embodiment, the drift analyser 310 is integrated with chat application 320, to enable overlaying changes visually for an end user. For example, suppose that a user utilizing chat application 320 receives messages from another user over chat application 320, such that the messages contain terms that are likely intended to be synonymous with previously used terms. In such a scenario, the drift analyser 310 may detect that the term is a synonym of a previously used term based at least in part on the probability that the terms are the same, based on the position of each term within a sequence of other words in a sentence. Further, in such a scenario, upon a determination that a term is a synonym of a previously used term, the term may be replaced with the previously used term on the user interface of chat application 320. In such a scenario, the user utilizing chat application 320 may receive messages from another user that contain the same terminology that the user customarily uses and understands.

For example, suppose two users are both communicating over a text-based chat application 320. During the conversation between the first user and the second user, the first user and the second user are discussing the functionality of a software program. The first user refers to the software program by the name of the software program, while the second user refers to the software program as "the tool". By analysing the context that each of the terms are used, an embodiment of the process disclosed herein determines that "the tool" is a synonym for the actual name of the software program that is being discussed between the two users. More specifically, determining a probability that the terms are synonyms of each other, and upon a determination that the probability meets a probability threshold, an embodiment of the disclosed method defines each term by the term's corresponding synonym.

In the illustrated embodiment, an administrator device 302 is shown deploying the drift analyzer 310. Further, administrator device 302 may include a backend administration system allows users with administrative privileges to perform various administrative tasks associated with the drift analyzer 310 as described herein, such as adjusting parameters, initiate training the summation model, and/or initiating probabilistic simulation utilizing the summation model.

Further, the drift analyser 310 may have various applications, as described herein. In an embodiment, the drift analyser 310 may be a standalone software application. In another embodiment, the drift analyser 310 may be integrated with another application.

In an embodiment, the drift analyser 310 may be utilized in part for fine-tuning of a large-language model ("LLM"). In an embodiment, the drift analyser module 310 provides temporal step data for a LLM, so that the LLM may discard tokens that are no longer valid based on the current time and/or context. Accordingly, the temporal step data provided for the LLM may enable more efficient accurate training and/or text generation, while reducing unnecessary utilization of computer resources caused due to outdated tokens.

In an embodiment, the drift analyser module 310 may be utilized for analysing comments retrieved from surveys or other user data, to improve information extraction from such user data. For example, suppose respondents use various different terms that all possess the same intended meaning by the respondents. In such a scenario, the various terms may be identified as synonyms, and any original term in the data may be replaced by a synonym of the original term.

In an embodiment, the drift analyser module 310 may be utilized for rewriting and/or updating documentation. For example, terminology may change over time, and such terminology that has become outdated or is otherwise inappropriate given the context may be identified and replaced by current terminology that possesses the same meaning as the original terminology.

In an embodiment, the drift analyser module 310 is integrated into a search engine application, to provide search results based on searched terms that have the same meaning as actual terms existing within some documentation or other text data source.

In the illustrated embodiment, the drift analyser 310 may be configured to edit JSON message data to store derived message data, including likelihood that a particular term will change meaning, and/or the likelihood that a first term and a second term are synonyms of each other.

Figure 4:
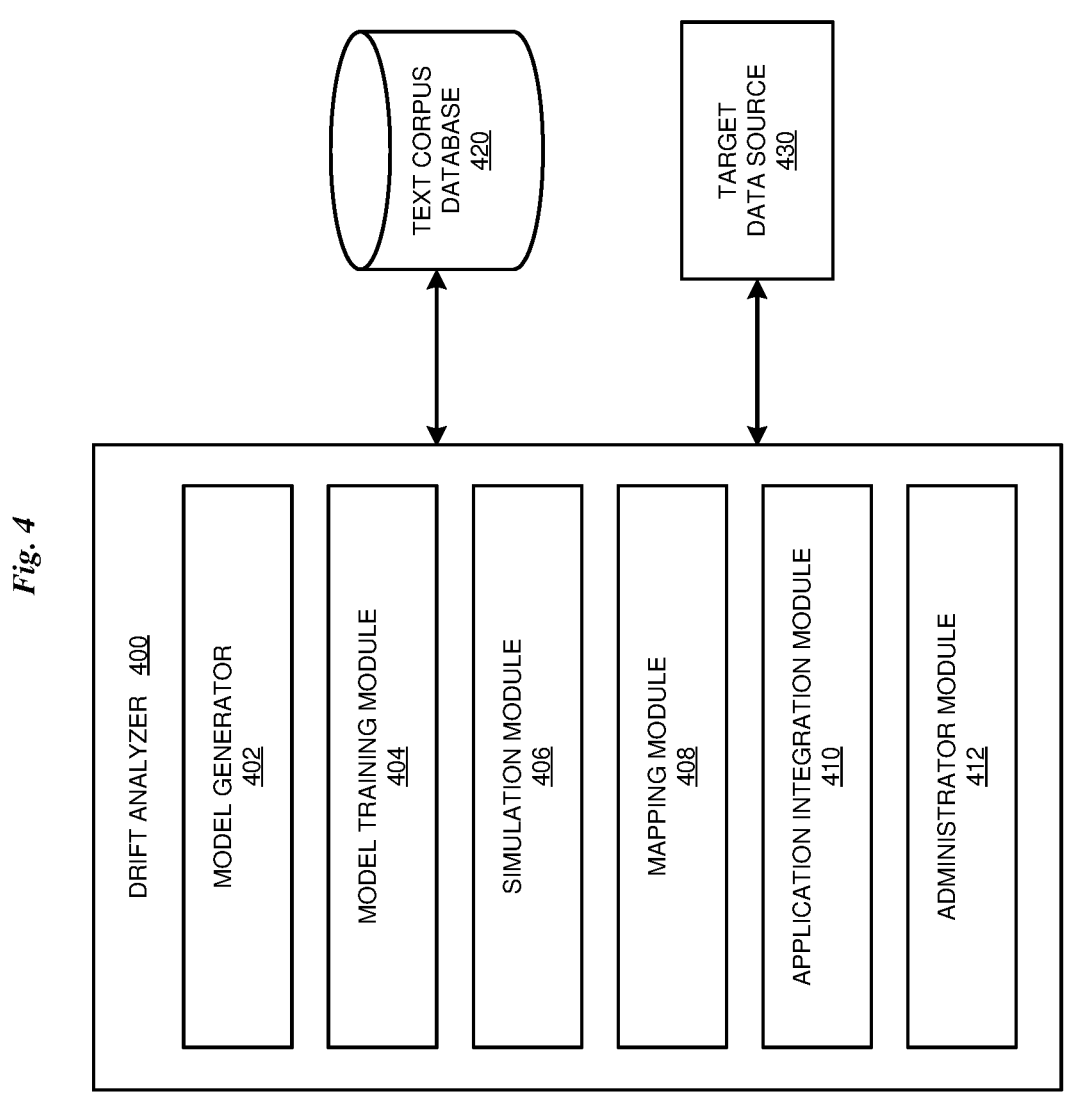
FIG. 4 depicts a block diagram of an example drift analysis module in accordance with an illustrative embodiment.

With reference to FIG. 4, this figure depicts a block diagram of an example drift analyzer module 400 in accordance with an illustrated embodiment. In the illustrated embodiment, drift analyzer module 400 may include aspects of drift analysis module 200 of FIG. 1 and/or drift analyzer 310 of FIG. 3.

In the illustrated embodiment, drift analyzer module 400 is a software module that includes a plurality of software modules, including a model generator module 402, a model trainer module 404, a simulation module 406, a mapping module 408, an application integration module 410, and an administrator module 412. In alternative embodiments, the drift analyzer module 400 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, model generator 402 is a software module configured to generate a discourse summation model, as described in greater detail herein. In an embodiment, the model generator is configured to generate a discourse summation model based at least in part on text data received from text corpus database 420. Text corpus database 420 may be established to store text data received from various text data sources, such as literary sources, technical documents, social media, blog posts, surveys, and so forth. In an embodiment, text data stored on text corpus database 420 may belong to a particular domain, such that terms within text data are associated with meanings according to the context of that particular domain. Although the discourse summation model generated by model generator module 402 may originate from a particular domain, it is contemplated herein that the discourse summation model may be generalized and/or re-trained for a different domain than the domain that the model had originally been trained on.

In the illustrated embodiment, the model training module 404 is a software module configured to train the discourse summation model generated by model generator module 402. Training the discourse summation model may include training the model using historical data. This may involve analyzing the context in which a term has been used in the past and establishing transition probabilities between different meanings based on collocations. Once the summation model is trained, the model can be used to predict the future state of the term in the corpus. In an embodiment, the model is continuously trained and updated as the corpus evolves and receives additional text data. This allows the model to adapt to shifts in language usage and predict when a term might change its meaning based on the emerging collocations.

In the illustrated embodiment, the simulation module 406 is a software module configured to perform a probabilistic simulation. Performing probabilistic simulation enables predicting the future state of a term in a corpus. Accordingly, performing a probabilistic simulation may result in updated transition probabilities between different meanings of terms based on emerging collocations. By processing new collocations, the model can estimate the likelihood of the term transitioning to a different meaning.

In the illustrated embodiment, the mapping module 408 is a software module configured to define a mapping between a set of terms and a set of synonym terms. In an embodiment, the drift analyzer module 400 is configured to detect a synonym term of a previously existing term contained in the text corpus database 420, based on a similarity between collocations of the suspected synonym term and the previously existing term. In such an embodiment, the previously existing term is defined by the synonym term in mapping. In an embodiment, the mapping module 408 is utilized to replace one or more target terms in a written discourse with one or more corresponding synonym terms, as described in greater detail herein.

In the illustrated embodiment, the integration module 410 is a software module configured to integrate the drift analyzer module 400 with another software application. In an embodiment, the drift analyzer module 400 integrates with another application via an application programming interface (API). The integration module 410 enables the drift analyzer module 400 to integrate with various software applications, as described in greater detail herein. For example, the drift analyzer module 400 may be integrated with a chat application to provide insights into symbolic drift of terminology employed in a real-time conversation between users. Other examples of software applications may include, but are not limited to, websites, web applications, social-media platforms, email services, collaboration tools, online forums, news platforms, survey applications, blogging applications, transcription applications, chat-bots, generative text applications, and any other application or medium that includes text data. In the illustrated embodiment, the administrator module 410 is a software module that enables a user having sufficient administrative privileges to perform certain actions and/or modify certain settings and/or parameters of the drift analyzer module 400.

Figure 5:
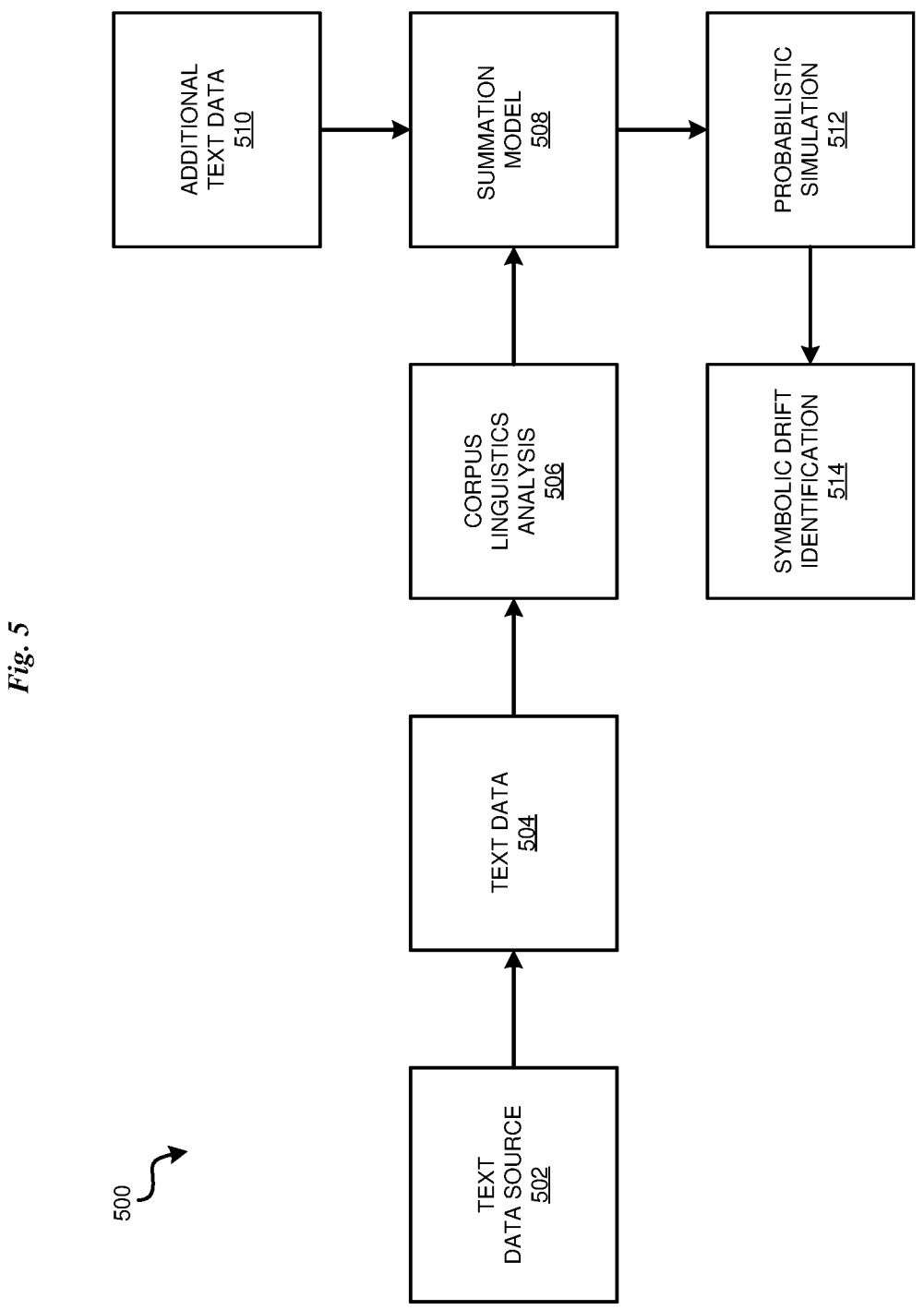
FIG. 5 depicts a block diagram of an example process for detecting symbolic drift accordance with an illustrative embodiment.

With reference to FIG. 5, this figure depicts a block diagram of an example process for detecting symbolic drift in accordance with an illustrative embodiment. In the illustrated embodiment, process 500 receives text data 504 from a text data source 502, which many include at least any text data source described herein. Further, the process 500 performs a corpus linguistic analysis 506 on the text data 504 received from the data source 502, and the results of the corpus linguistics analysis 506 may be utilized to construct and train summation model 508. Once the summation model 508 is sufficiently trained, the summation model may receive additional text data 510 to perform a probabilistic simulation 512. Further, the results of the probabilistic simulation 512 provide a symbolic drift identification 514 pertaining to one or more words of the additional text data 510 that was input into the trained summation model 508.

Figure 6:
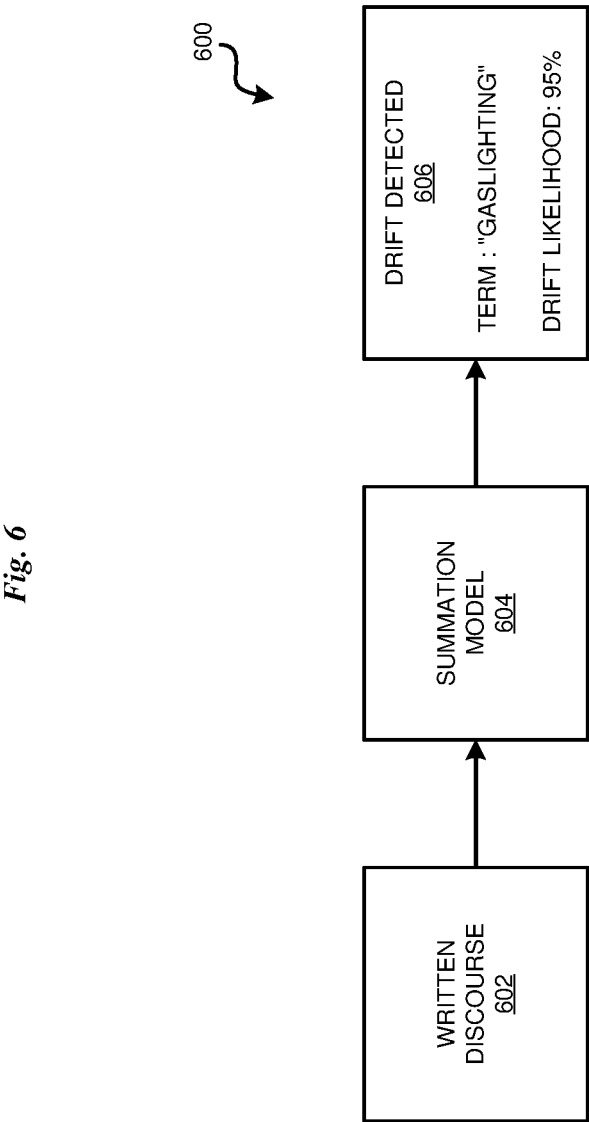
FIG. 6 depicts a block diagram of an example process for predicting symbolic drift in a written discourse in accordance with an illustrative embodiment.

With reference to FIG. 6, this figure depicts a block diagram of an example process for predicting symbolic drift in a written discourse in accordance with an illustrative embodiment. In the illustrated embodiment, summation model 604 may include summation model 508 of FIG. 5. In the illustrated embodiment, a written discourse 602 is input to the summation model 604. In response to processing the written discourse 602, the summation model 604 outputs a probability that a meaning of one or more terms within the written discourse 602 is going to change from its present meaning. In the illustrated embodiment, the output probability is displayed via a drift detection interface 606, such that the drift detection interface 606 displays the term that has experienced a change in co-occurrence of collocate terms, and the associated probability of that term changing meaning based on the changing co-occurrence of collocate terms. Accordingly, in the example depicted embodiment, the term "gaslighting" has been detected with a 99% probability that the term will change meaning, indicating that the present meaning of the term will change with respect to the original or other formerly associated meaning of the term.

With reference to FIG. 7, this figure depicts a flowchart of an example process for identifying symbolic drift in accordance with an illustrative embodiment. In the illustrated embodiment, steps of process 700 may be carried out by drift analysis module 200 of FIG. 1, drift analyzer 310 of FIG. 3, and/or drift analyzer 400 of FIG. 4.

At step 702, the process establishes a text corpus from a plurality of sample text data sources. The sample text data sources may include at least any of the text data sources described herein. In an embodiment, the text corpus comprises a set of terms, as well as collocations for each term of the set of terms. Accordingly, the frequency of appearance of similar collocations for each term may be indicative of a relationship between a particular term and other terms to the left and/or to the right of the particular term. At step 704, the process extracts a first set of terms from the text corpus. At step 706, the process extracts a first set of collocations for each term of the first set of terms of the text corpus.

At step 708, the process constructs a model based at least in part on the first set of terms and the first set of collocations for each term of the first set of terms. In an embodiment, the model includes a discrete Markov model. The collocates of each term enable establishing transition probabilities between different meanings of each term based on collocations. Once the Markov model is trained, the model can be used to predict the future state of the term in the corpus.

At step 710, the process receives additional text data into the trained model. If terms of the additional text data comprise new or different collocations, the model can estimate the likelihood of the term transitioning to a different meaning. At step 712, the process determines a probability of symbolic drift for each term of a set of terms of the additional text data input into the trained model. In an embodiment, the model is continuously updated as the corpus stored on text corpus evolves and receives additional text data, which enables the model to adapt to shifts in language usage and predict when a term might change its meaning based on the emerging collocations of terms. At step 714, the process displays probability of symbolic calculated for one or more terms of the additional data text on a user interface.

With reference to FIG. 8, this figure depicts a flowchart of an example process for detecting a synonym in a written discourse in accordance with an illustrative embodiment. In the illustrated embodiment, steps of process 700 may be carried out by drift analysis module 200 of FIG. 1, drift analyzer 310 of FIG. 3, and/or drift analyzer 400 of FIG. 4.

At step 802, the process receives a first text data input. At step 804, the process determines a set of collocations for each term of the first text data input. At step 806, the process receives a second text data input. At step 808, the process determines a set of collocations for each term of the second text data input.

At step 810, the process constructs a mapping between a portion of terms of the first text data input and a portion of terms of the second text data input. In an embodiment, the process compares each term of the first text data input and each set of collocations for each term of the first text data input to each term of the second text data input and each set of collocations for each term of the second text data input to determine a set of synonym terms between the first text data input and the second text data input. In an embodiment, the process detects synonyms via one or more probabilistic simulation techniques, as described in greater detail herein. In an embodiment, the process analyzes collocations of terms of the first text data input and the second text data input to determine whether the collocations indicate that one or more terms are synonyms of each other.

Further, upon a determination that some terms are synonyms of each other, the process constructs a mapping defining each term of the set of synonym terms with a corresponding synonym term. For example, suppose the first text data input utilizes the term "Automated Business Tool" while the second text data input utilizes the term "ABT" to the refer to the same concept or thing. In such a scenario, the process may define "Automated Business Tool" with its corresponding synonym "ABT". In an embodiment, the process constructs a mapping based on terms that meet a predetermined likelihood threshold that the terms are synonyms of each other. For example, in an embodiment, terms with a 95% likelihood to be synonyms may be defined by the mapping as synonyms of each other.

At step 812, the process parses target text data to identify a target term. In an embodiment, the target text data is received from a written discourse source. In an embodiment, the target text data may comprise either the first text data input or the second text data input. In some other embodiments, the target text data originates from a text data source that has not previously been received by the process until this step.

At step 814, the process compares the target term against the mapping to identify a replacement term. Given that the target term belongs to a portion of the terms of the first text data input or to a portion of terms of the second data text input, the target term will correspond to a counterpart synonym term defined by the mapping. Accordingly, at step 814, the process compares the target term against the mapping to identify a replacement term. For example, the result of parsing the target data source at step 812 may include identifying a target term that is defined by the mapping. In such a scenario, at step 814, the process may compare the target term against the mapping to identify a replacement term for the target term, such that the replacement term is a synonym of the target term previously identified at step 812.

At step 816, the process generates a modified representation of the target text data comprising the replacement term in place of the target term. Accordingly, the process may replace the target term with the replacement term to in every instance of the target term within the target text data construct a modified representation of the target text data. For example, suppose the target term is "ABT" which is defined by the mapping with its corresponding synonym "Automated Business Tool". In such a scenario, the process may construct a modified representation of the target text data that contains each instance of the term "ABT" replaced with the term "Automated Business Tool". At step 818, the process displays the modified representation of the target text data on a user interface of a user device.

Figure 9:
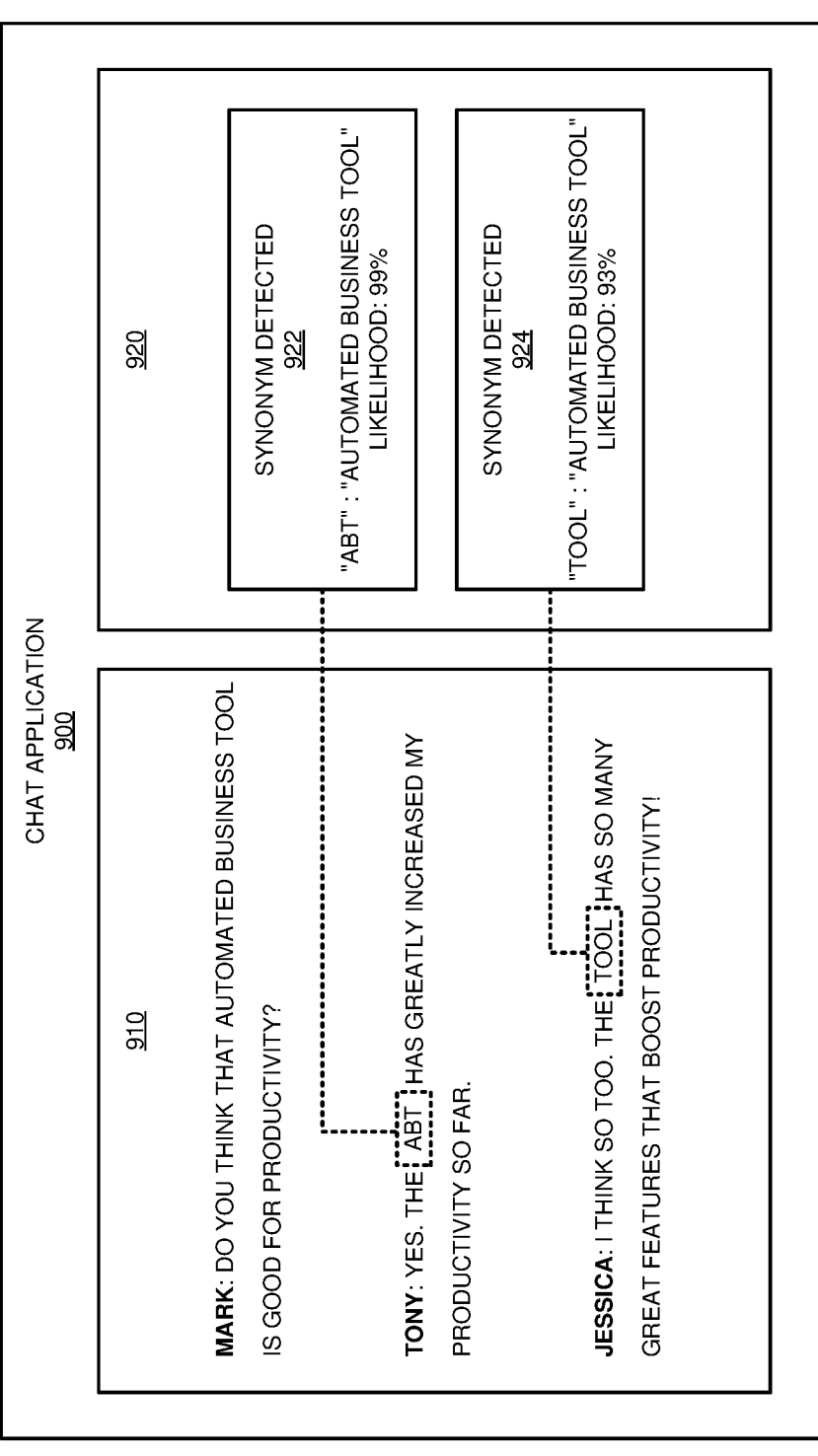
FIG. 9 depicts a block diagram of an example user interface of a chat application integrated with drift analysis software in accordance with an illustrative embodiment.

With reference to FIG. 9, this figure depicts a block diagram of an example chat application 900 integrated with drift analysis software in accordance with an illustrative embodiment. In the illustrated embodiment, the drift analyzer module 920 may include aspects of drift analysis module 200 of FIG. 1, drift analyzer 310 of FIG. 3, and/or drift analyzer 400 of FIG. 4.

In the illustrated embodiment, the diagram of user interface of a chat application 900 depicts a conversation 910 taking place between three users: Mark, Tony, and Jessica. As depicted, Mark asks Tony and Jessica: "Do you think that the Automated Business Tool is good for productivity?" In response to Mark's question, Tony responds: "Yes. The ABT has greatly increased my productivity so far." Further, likewise in response to Mark's question, Jessica responds: "I think so too. The tool has so many great features that boost productivity!" In the example scenario depicted, the terms "Automated Business Tool", "ABT", and "tool" are all synonyms of each other. Further, based at least in part on the collocations of each term, the drift analyzer 920 is able to detect that the terms are synonyms with a certain amount of confidence, measured as a likelihood that one term is a synonym of the other term.

In the illustrated, the drift analyzer module 920 is shown including a GUI that is integrated with the GUI of the chat application 900. Accordingly, in the illustrated embodiment, detected synonyms may be visually overlayed in the GUI of the chat application 900 to indicate to a user that a synonym has been detected. The example user interface depicted is not intended to be limiting, but instead is provided for the sake of simplicity and clarity. Other user interface arrangements are considered to be within the scope of the present disclosure, and the particular arrangement of graphic elements is not necessarily a limiting aspect of the present disclosure. As shown in the illustrated embodiment, the drift analyzer module detected a first synonym 922 and a second synonym 924. Accordingly, the first synonym 922 that has been estimated as having 99% likelihood as corresponding to the term "Automated Business Tool", and the second synonym 924 that has been detected has been estimated as having a 93% likelihood as corresponding to the term "Automated Business Tool".

The chat application 900 of FIG. 9 only represents one application of embodiments of systems and/or processes for symbolic drift identification as described herein. Accordingly, the chat application 900 integrated with the drift analyzer module 920 represents an embodiment directed towards identifying one or more synonym terms in real-time chat discourse based at least in part by similarity and/or frequency of co-occurring collocate terms associated with certain terms. Other embodiments comprising synonym identification may include, but are not limited to, the following example applications.

An embodiment of the present disclosure generates an annotated written discourse, such that the annotated written discourse comprises annotations that define terms based at least in part on the historical or other context in which the written discourse was originally written. For example, it may be the case that in a particular moment in time, a particular symbol possesses a particular meaning and/or connotation. Further, it may be the case that at a subsequent moment in time, that particular symbol possesses a different meaning and/or connotation than the symbol had previously possessed. In order to more fully understand the meaning or message conveyed in a particular written discourse, it may be useful to understand the meaning of words within that written discourse according to the historical context in which those words were chosen to be included into the written discourse. Since words often change meaning over time, the meaning and/or connotations of a written discourse may likewise be appreciated differently depending on the moment of time in which the written discourse is read in comparison to when the written discourse has been written.

An embodiment of the present disclosure includes automatically rewriting a previously existing document for a particular audience that may be different from the original audience that the previously existing document had originally been written for. Accordingly, even among speakers of the same language, different terminology and or phrases may be utilized depending on the locale, historical context, and/or cultural context associated with the speakers. For example, a speaker in London may use the phrase "the tube" to refer to an underground railway, whereas a speaker in New York may use the phrase "the subway" to refer to the underground railway. Many other words and/or phrases may be utilized differently between speakers of different context. Although both speakers may be speaking the same language, it is evident that the terminology they may use to refer to certain things may differ. Accordingly, embodiments of the present disclosure include automatically rewriting documents for a particular audience/context.

An embodiment of the present disclosure translates comments/responses received from surveys, submission forms, or any other user generated data. Further, embodiments of the present disclosure may be utilized as part of analysis techniques used to analyze comments/responses retrieved from surveys, submission forms, or other user data, where respondents may use different terms to mean the same concept (e.g., "the tool", "IBM Sales Cloud", "ISC").

An embodiment of the present disclosure includes automatically rewriting a previously existing document (EULAs, user documentation, development documentation, contracts, etc.) in response to identification that any term(s) have changed over time. An embodiment automatically generates updated documentation that recite current terms of art. Further, embodiments comprising determining likelihood that a meaning of a term will shift based on changing collocations over time or with respect to context are also considered in the scope of the present disclosure. Some other embodiments comprising symbolic drift likelihood may include, but are not limited to, the following example applications.

Further, embodiments of the present disclosure enable fine-tuning of a large language model ("LLM"). For example, embodiments of the present disclosure may provide temporal step data for an LLM, thereby enabling the LLM to know when to discard tokens that are no longer valid. For example, since terminology changes over time, certain terminology may effectively become outdated over time. For example, in the context of real estate, the term "master bedroom" has effectively been replaced by the term "primary bedroom". Suppose that an LLM is trained to generate text to describe different rooms of a house. In such a scenario, it would no longer be appropriate for the LLM to generate a description that includes the term "master bedroom", so instead may discard the token "master bedroom" and opt to utilize the token "primary bedroom" in instances in which "master bedroom" was previously used. One advantage contemplated by fine-tuning an LLM in this manner includes faster and more efficient text generation enabled by reduction of potential utilization of unnecessary tokens. Accordingly, fine-tuning an LLM with temporal step data generated via embodiments of the process disclosed herein improves the functioning of an LLM as well as the underlying computer technology utilized to run the LLM at least by reducing the amount of compute resources utilized in training and/or running the LLM.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
integrating a drift analyzer graphical user interface (GUI) with a chat application graphical user interface (GUI) of a chat application;
establishing a text corpus database, the text corpus database comprising text data received from a written discourse, wherein the written discourse comprises a real-time chat discourse received from the chat application;
extracting a first set of terms from the text corpus database and a first set of collocations for each term of the first set of terms;
constructing a summation model based at least in part on the first set of terms and the first set of collocations for each term of the first set of terms;
inputting additional text data into the summation model to determine a probability score that defines the probability that a term stored on the text corpus database will change meaning;
overlaying computer-generated graphics on the chat application GUI upon detecting that the term stored on the text corpus database will change meaning; and
displaying the probability score on on the drift analyzer GUI.

2. The computer-implemented method of claim 1, wherein the summation model comprises a discrete Markov model.

3. The computer-implemented method of claim 1, further comprising generating temporal step data for each term stored on the text corpus database, wherein the temporal step data tracks the symbolic drift of each term.

4. The computer-implemented method of claim 1, wherein the summation model is trained for a first domain, and wherein the method further comprises re-training the summation model for a second domain that is different than the first domain.

5. The computer-implemented method of claim 1, further comprising identifying a synonym term within the additional text data corresponding to an existing term stored on the text corpus database.

6. A computer program product comprising one or more computer readable storage media, and program instructions collectively stored on the one or more computer readable storage media, the program instructions executable by a processor to cause the processor to perform operations comprising:

integrating a drift analyzer graphical user interface (GUI) with a chat application graphical user interface (GUI) of a chat application;

establishing a text corpus database, the text corpus database comprising text data received from a written discourse, wherein the written discourse comprises a real-time chat discourse received from the chat application;

extracting a first set of terms from the text corpus database and a first set of collocations for each term of the first set of terms;

constructing a summation model based at least in part on the first set of terms and the first set of collocations for each term of the first set of terms;

inputting additional text data into the summation model to determine a probability score that defines the probability that a term stored on the text corpus database will change meaning;

overlaying computer-generated graphics on the chat application GUI upon detecting that the term stored on the text corpus database will change meaning; and displaying the probability score on on the drift analyzer GUI.

7. The computer program product of claim 6, wherein the stored program instructions are stored in a computer readable storage device in a data processing system, and wherein the stored program instructions are transferred over a network from a remote data processing system.

8. The computer program product of claim 6, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

9. The computer program product of claim 6, wherein the summation model comprises a discrete Markov model.

10. The computer program product of claim 6, further comprising generating temporal step data for each term stored on the text corpus database, wherein the temporal step data tracks the symbolic drift of each term.

11. The computer program product of claim 6, wherein the summation model is trained for a first domain, and wherein the method further comprises re-training the summation model for a second domain that is different than the first domain.

12. The computer program product of claim 6, further comprising identifying a synonym term within the additional text data corresponding to an existing term stored on the text corpus database.

13. A computer system comprising a processor and one or more computer readable storage media, and program instructions collectively stored on the one or more computer readable storage media, the program instructions executable by the processor to cause the processor to perform operations comprising:

integrating a drift analyzer graphical user interface (GUI) with a chat application graphical user interface (GUI) of a chat application;

establishing a text corpus database, the text corpus database comprising text data received from a written discourse, wherein the written discourse comprises a real-time chat discourse received from the chat application;

extracting a first set of terms from the text corpus database and a first set of collocations for each term of the first set of terms;

constructing a summation model based at least in part on the first set of terms and the first set of collocations for each term of the first set of terms;

inputting additional text data into the summation model to determine a probability score that defines the probability that a term stored on the text corpus database will change meaning;

overlaying computer-generated graphics on the chat application GUI upon detecting that the term stored on the text corpus database will change meaning; and displaying the probability score on on the drift analyzer GUI.

14. The computer system of claim 13, wherein the summation model comprises a discrete Markov model.

15. The computer system of claim 13, further comprising generating temporal step data for each term stored on the text corpus database, wherein the temporal step data tracks the symbolic drift of each term.

16. The computer system of claim 13, wherein the summation model is trained for a first domain, and wherein the system further comprises re-training the summation model for a second domain that is different than the first domain.

17. The computer system of claim 13, further comprising identifying a synonym term within the additional text data corresponding to an existing term stored on the text corpus database.

18. The computer system of claim 17, further comprising generating a modified representation of the additional text data, wherein the modified representation of the additional text data comprises the identified synonym term replaced with the existing term.

* * * * *